United States Patent Office.

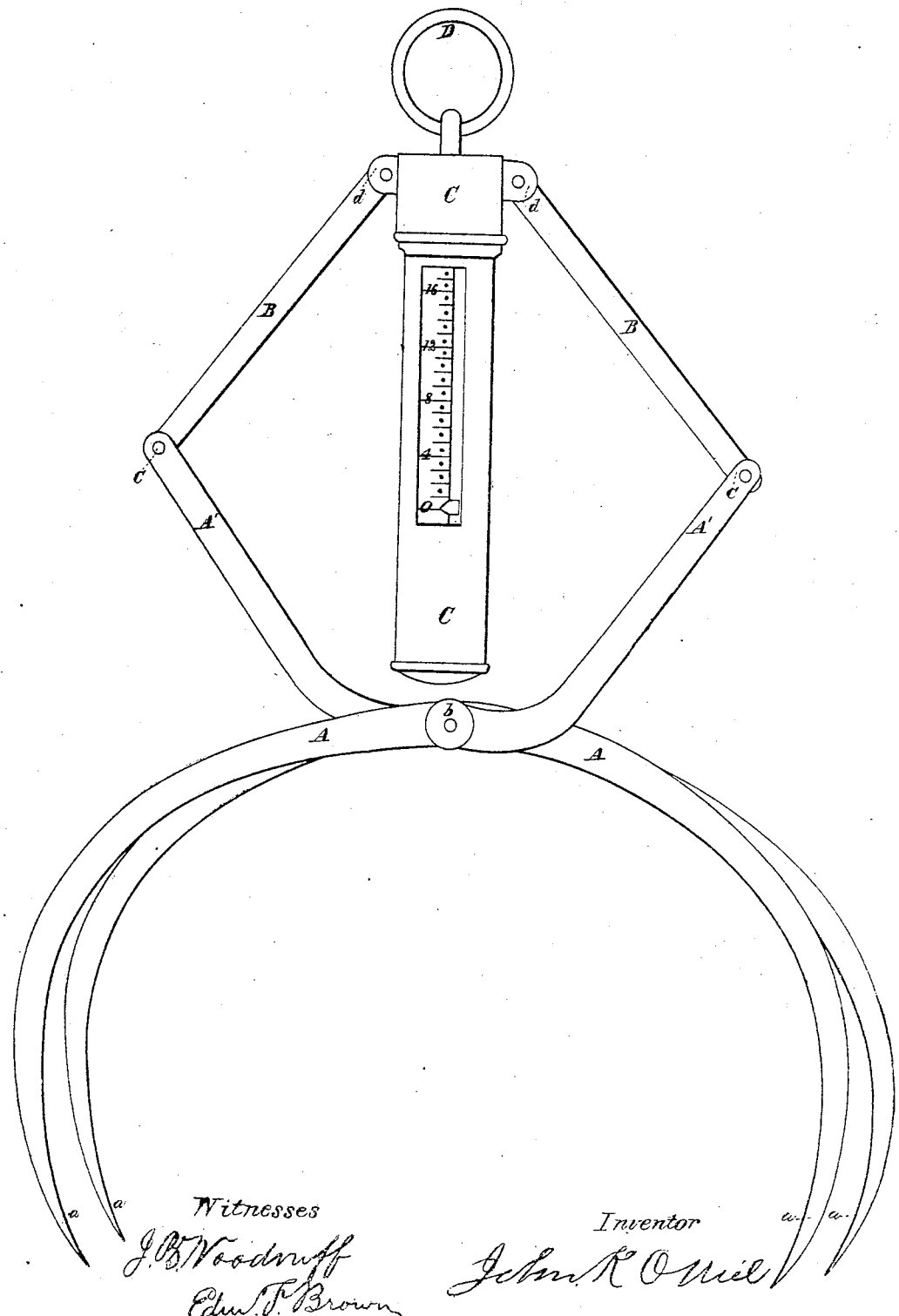

JOHN K. O'NEIL, OF KINGSTON, NEW YORK.

IMPROVEMENT IN HORSE HAY-FORKS.

Specification forming part of Letters Patent No. 54,007, dated April 17, 1866.

*To all whom it may concern:*

Be it known that I, JOHN K. O'NEIL, of the town of Kingston, in the county of Ulster, in the State of New York, have invented a certain new and useful Weighing Hay-Fork; and the following is a full, clear, and exact description of the same, reference being had to the accompanying drawing, making a part of this specification, in which the figure shows the attachment of a spring-balance to a grappling hay-fork.

The object of my invention is to weigh hay, straw, or other substances as it is being handled for loading or unloading.

My invention consists in the attachment and combination of a spring-balance or other weighing-instrument to grappling hooks or forks in such a manner that when anything is contained within the clasping-prongs and lifted up so as to swing clear the weight will be indicated and accurately known.

To enable others skilled in the art to make and use my invention, I will describe it more fully, referring to the drawings and to the letters marked thereon.

I make the hooks or forks A A with any desired number of prongs *a a*, and so shape them as to best take hold of hay, straw, or any other substance, and clasp it to load or unload or handle in any manner. To the levers of the forks A A, which are hinged together by a pin or bolt, *b*, so that the forks can be thrown wide apart or contracted and brought close together, I attach bars B B, they having joints *c c*, to connect them with the levers A′ A′, and also joints *d d*, to connect them with the spring-balance C or weighing-instrument, which is placed between them, so that when the prongs or forks *a a* have taken hold of any substance, and it is lifted up by the ring D, the article is being weighed, thus saving much time and labor.

When loading hay in the field the quantity or weight of each load may be accurately known without the loss of time or the trouble of going to a hay-scale and the expense attending.

Where it can be done, most farmers and stock-raisers in the country would like to be able to know the weight of their hay and other crops as they are being gathered in and stored away for winter use; and also in taking hay, straw, or grain in sacks, or many other articles, to market, they can be weighed while either loading or unloading, and an immense saving of time and labor is effected, to the entire satisfaction of both the seller and the buyer. Thus it will be seen that my weighing hay-fork will be of great practical utility, and is an article much needed.

Having thus described my invention, what I claim as new, and desire to secure by Letters Patent, is—

The combination of a weighing device and horse hay-fork in such manner that the weight of the load will always be indicated when the fork is elevated, substantially as described.

JOHN K. O'NEIL.

Witnesses:
 J. B. WOODRUFF,
 EDM. F. BROWN.